United States Patent [19]

Yamano

[11] Patent Number: 5,783,888
[45] Date of Patent: Jul. 21, 1998

[54] ROTARY ELECTRIC MACHINE

[75] Inventor: Kenji Yamano, Kanagawa, Japan

[73] Assignee: Fuji Electric Co., Ltd., Kanagawa, Japan

[21] Appl. No.: 401,004

[22] Filed: Mar. 9, 1995

[30] Foreign Application Priority Data

Mar. 17, 1994 [JP] Japan .................................. 6-046257

[51] Int. Cl.$^6$ .............................. H02K 5/00; H02K 1/04; H02K 5/16; H02K 9/00
[52] U.S. Cl. .................. 310/91; 310/43; 310/58; 310/89; 310/90; 310/254; 310/261
[58] Field of Search .................. 310/91, 90, 67 R, 310/162, 261, 265, 42, 44, 45, 254, 89, 43, 58

[56] References Cited

U.S. PATENT DOCUMENTS

| | | | |
|---|---|---|---|
| 3,513,339 | 5/1970 | Harris et al. | 310/265 |
| 4,015,154 | 3/1977 | Tanaka et al. | 310/42 |
| 4,129,796 | 12/1978 | Papst | 310/43 |
| 4,384,226 | 5/1983 | Sato et al. | 310/89 |
| 4,496,866 | 1/1985 | Yamamoto et al. | 310/87 |
| 4,585,966 | 4/1986 | Nishida et al. | 310/87 |
| 4,795,931 | 1/1989 | Sturm | 310/90 |
| 5,075,585 | 12/1991 | Teruyama et al. | 310/89 |

FOREIGN PATENT DOCUMENTS

| | | |
|---|---|---|
| 18 85 242 | 12/1962 | Germany . |
| 19 66 275 | 11/1964 | Germany . |
| 721577 | 1/1955 | United Kingdom . |
| 1 468 808 | 3/1977 | United Kingdom . |

OTHER PUBLICATIONS

Die Erwarmung bei electrischen Maschinen, insbesondere bei Drehstrom–Asynchron–Motoren, Siemens–Schuckertwerke AG, Technische Berichte MTV Nr. 2, Feb. 1951, pp. 11–17.

Primary Examiner—Steven L. Stephan
Assistant Examiner—Michael J. Wallace, Jr.
Attorney, Agent, or Firm—Finnegan, Henderson, Farabow, Garrett & Dunner, L.L.P.

[57] ABSTRACT

A cylindrical bearing box 2 is integrally provided at the axial center of an annular disk 1 on which a flange 1a is formed. A shaft 3 is attached to a pair of bearings 2a, 2b engaged with the bearing box 2. A rotary disk 4 attached the shaft 3 on a side opposite to the drive side is molded integrally with a conductor 5a of a rotor 5 arranged outside of the bearing box 2 in the radial direction. A stator 6 arranged outside of the rotor 5 through a magnetic clearance is attached to the stationary side of the rotary electric machine. A synthetic resin member 7, the electric insulating property and heat conductivity of which are high, is molded in the overall periphery of the stator 6 including the winding 6a and the iron core 6b. An end face of the synthetic resin member 7 on the drive side is closely contacted with the annular disk and attached by a screw 1b. Blades 4a are provided on an outer end face of the rotary disk 4 and enclosed by a fan cover 4b. A shaft seal device 8 is provided in a gap formed between a small diameter end face portion 7a of the synthetic resin member 7 on a side opposite to the drive side and the rotary disk 4.

6 Claims, 3 Drawing Sheets

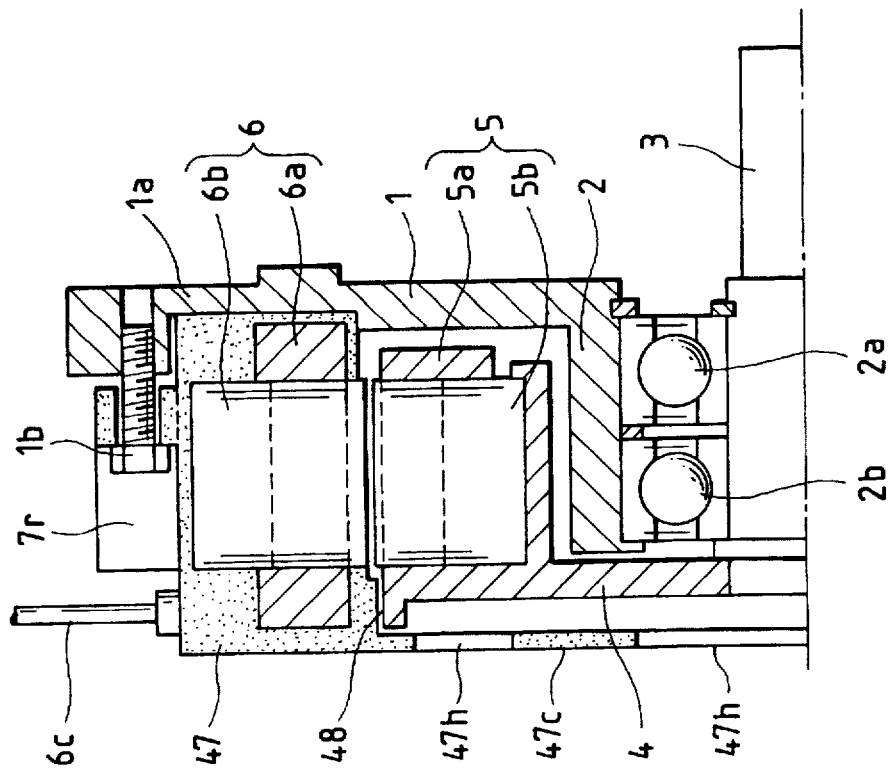
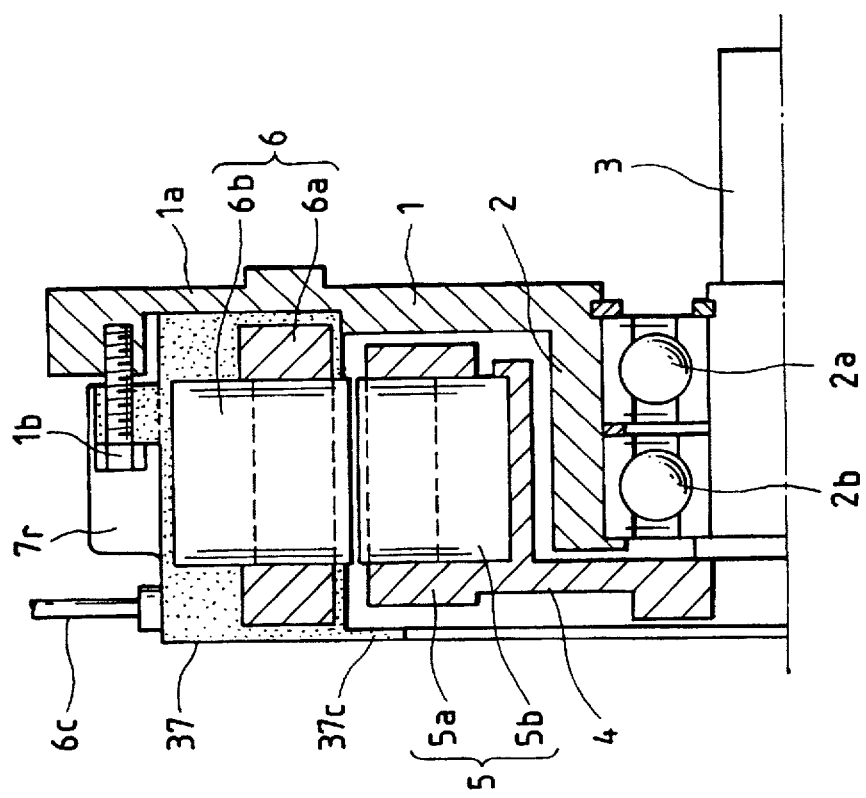

ROTARY ELECTRIC MACHINE

BACKGROUND OF THE INVENTION

1. Field of the Invention

The present invention relates to a flange type totally-enclosed or open rotary electric machine in which bearings are arranged inside of a rotor arranged inside of a stator.

2. Description of the Related Art

For example, in a general purpose electric motor in which bearings are arranged on both sides of a shaft to which a rotor is attached, the length of the motor is relatively long in the axial direction compared with the diameter of the motor. In the case where the diameter of a load is not appreciably larger than that of the motor, no problems are caused in an exclusively occupied space in which the motor and load are directly connected. However, in the case where the diameter of a load is large or a plurality of electric motors are attached onto a wall surface of a machine to which a plurality of loads are assembled, a useless exclusive space is required for the motor which is elongated in the axial direction, whereby an operator will be in danger when he passes through the vicinity of the machine.

FIG. 6 is a sectional view of a conventional totally-enclosed type fan-cooled electric motor, wherein a half portion of the motor is illustrated. FIG. 6 shows a motor provided when a standard motor is compressed to the utmost limit. In the drawing, a flange 61f is formed on the outer end surface of a bracket 61a. This bracket 61a is formed integrally with a frame 62. A bracket 61b is attached to the frame 62 on a side opposite to the flange. Bearings 63a and 63b are attached to the brackets 61a and 61b, and a shaft 64 is supported by the bearings 63a, 63b. A rotor 65 comprised of a conductor 65a and an iron core 65b is attached onto the shaft 64. Outside the rotor 65, a stator 66 comprised of a winding 66a and an iron core 66b is attached to a frame 62 through a magnetic clearance. A fan 67 is attached to the shaft 64 penetrating through the bracket 61b. The fan 67 is enclosed by a fan cover 68. A ratio of the compression of this conventional motor with respect to the compression of a general purpose standard electric motor is 40% at the limit, wherein the compression is defined as a ratio of the length in the axial direction to the diameter.

In the conventional example described above, the following problems may be encountered with respect to the compression and cooling.

Problems Concerning the Compression (1) In order to provide a compressed motor, the bearings 63a and 63b are arranged close to the iron core 65b of the rotor 65, and the conductor 65a is located outside of the bearings 63a and 63b in the radial direction. Therefore, an inner circumference of the iron core 65b is of no use from the electromagnetic viewpoint. For this reason, the compression is limited.

(2) In the axial direction, not only the bracket 61a but also the bracket 61b is required. Inside the brackets 61a, 61b, a useless clearance must be provided between the winding 66a and the brackets 61a, 61b, and outside the brackets 61a and 61b, a clearance must be formed between the fan 67 and the bracket 61b. Accordingly, useless clearances are generated in the axial direction.

Problems Concerning the Cooling (3) Since the winding 66a is subjected to varnish treatment together with the iron core 66b, a large number of air bubbles are generated in the winding, so that the heat transfer coefficient of the winding 66a is not necessarily enhanced.

(4) The winding 66a is cooled when heat is diffused in the following two manners:

One is a manner in which the heat of the winding 66a itself is emitted toward the outside air through the iron core 66b and the frame 62. The other is a manner in which the heat is emitted toward the outside air through the inside air (the air provided in a space enclosed by the bracket 61a, frame 62 and bracket 61b except for the space occupied by the stator 66 and rotor 65) and the frame 62. The iron core 66b is formed of a lamination of steel sheets so that a close contact area of the iron core 66b with the frame 62 is smaller than it appears. Therefore, the thermal resistance is high. Further, when heat is emitted through the inside air, air is not a good conductor of heat, so that the winding 66a is not necessarily sufficiently cooled.

(5) The bearings 63a and 63b are exposed to the inside air of high temperature, and further heat is conducted from the stator 66 of high temperature to the bearings 63a and 63b through the brackets 61a and 61b. Accordingly, temperatures of the bearings 63a and 63b are raised, with the result that low running temperature is required for a lubricant in the bearing.

SUMMARY OF THE INVENTION

It is an object of the present invention to provide a totally-enclosed type or an open type rotary electric machine in which the compression of the rotary machine is pursued to the utmost limit and the bearing temperature can be reduced.

According to a first aspect of the invention, there is provided a rotary electric machine comprising: a flange to which an opponent machine is attached, the flange being formed on an outer end surface of an annular disk; a cylindrical bearing box integrally formed at an axis of the annular disk, the cylindrical bearing box being engaged with a pair of bearings; a rotary disk attached to a shaft engaged with the bearings on a side opposite to the flange, the end of the shaft being protruded to the flange side; a rotor integrally formed on the rotary disk, the rotor being arranged on the outside of the bearing box in the radial direction; and a stator attached to a stationary side of the electric machine, the stator being arranged on the outside of the rotor through a magnetic clearance, wherein a synthetic resin member having an electrical insulating property and heat conductivity is molded on the entire circumference of the stator including a winding and iron core so that the synthetic resin member is closely contacted with the annular disk on the side surface of the flange, fan blades formed on the outer end surface of the rotary disk are enclosed by a fan cover, and a shaft seal device is formed in a clearance between a portion from an end surface small diameter part of the synthetic resin member on the side opposite to the flange to an inner circumferential end surface part and the rotary disk or a conductor of the rotor, so that a totally-enclosed type fan-cooled electric machine is provided.

According to a second aspect of the invention, there is provided a rotary electric machine comprising: a flange to which an opponent machine is attached, the flange being formed on an outer end surface of an annular disk; a cylindrical bearing box integrally formed at an axis of the annular disk, the cylindrical bearing box being engaged with a pair of bearings; a rotary disk attached to a shaft engaged with the bearings onto a side opposite to the flange, the end of the shaft being protruded to the flange side; a rotor integrally formed on the rotary disk, the rotor being arranged on the outside of the bearing box in the radial direction; and a stator attached to a stationary side of the electric machine, the stator being arranged on the outside of the rotor through a magnetic clearance, wherein a synthetic resin member having an electrical insulating property and heat conductivity is molded on the entire circumference of the stator including a winding and iron core so that the synthetic resin member is closely contacted with the annular disk on the side surface of the flange, and a cover enclosing an end surface of the electric machine on the side opposite to the flange is molded integrally with the synthetic resin member, so that a totally-enclosed type fan-cooled electric machine is provided.

According to a third aspect of the invention, there is provided a rotary electric machine comprising: a flange to which an opponent machine is attached, the flange being formed on an outer end surface of an annular disk; a cylindrical bearing box integrally formed at an axis of the annular disk, the cylindrical bearing box being engaged with a pair of bearings; a rotary disk attached to a shaft engaged with the bearings onto a side opposite to the flange, the end of the shaft being protruded to the flange side; a rotor integrally formed on the rotary disk, the rotor being arranged on the outside of the bearing box in the radial direction; and a stator attached to a stationary side of the electric machine, the stator being arranged on the outside of the rotor through a magnetic clearance, wherein a synthetic resin member having an electrical insulating property and heat conductivity is molded on the entire circumference of the stator including a winding and iron core so that the synthetic resin member is closely contacted with the annular disk on the side surface of the flange, and a cover enclosing an end surface of the electric machine on the side opposite to the flange is molded integrally with the synthetic resin member, so that a ventilating hole is formed on the cover to provide an open type electric machine.

According to a fourth aspect of the invention, there is provided a rotary electric machine comprising: a flange to which an opponent machine is attached, the flange being formed on an outer end surface of an annular disk; a synthetic resin member having an electrical insulating property and heat conductivity, molded on the entire circumference of the stator including the winding and iron core, the synthetic resin member being closely contacted with the annular disk on the side surface of the flange; a cover covering an end surface opposite to the flange of the electric machine; a cylindrical bearing box engaging with a pair of bearings, the cylindrical bearing box being arranged at an axis of the cover, wherein the cover and the cylindrical bearing box are molded integrally with the synthetic resin member; a rotary disk attached to a shaft engaged with the bearings, the end of the shaft protruding onto the flange side, the rotary disk being arrange on the flange side of the shaft; a rotor arranged outside of the bearing box in the radial direction, the rotor being integrated with the rotary disk; and a stator arranged outside of the rotor through a magnetic clearance, so that an open type electric machine is provided.

According to a fifth aspect of the invention, there is provided a rotary electric machine according to the first to fourth aspects of the invention, wherein the annular disk and the synthetic resin member are integrally molded.

According to the first aspect of the invention, the following advantages are provided:

(1) The bearing box and bearing are arranged inside the rotor in the radial direction. Therefore, the totally-enclosed type rotary electric machine can be compressed.

(2) Instead of the two brackets, one annular disk having a bearing box composes a frame of the totally-enclosed type rotary electric machine. Therefore, the length can be reduced in the axial direction, and the rotary electric machine can be compressed. Although the rotary disk is arranged at the bearing box in the axial direction, the axial length of the radial disk (the bearing box) is almost absorbed by the length of the end portion of the winding of the stator in the axial direction, so that the length in the axial direction is not substantially extended. Furthermore, a shaft seal device provided between the rotary disk or rotor conductor and the synthetic resin member also functions as the totally-enclosed structure on a side opposite to the flange. Accordingly, unlike the conventional bracket, a useless clearance is not formed in the axial direction.

(3) The winding itself is impregnated with the synthetic resin member, the heat conductivity of which is high. Therefore, it is possible to prevent the generation of blow holes in a bundle of the windings, and the heat transfer coefficient of the winding is enhanced.

(4) Heat of the winding is directly emitted to the outside air through the outer circumference of the synthetic resin member, the heat conductivity of which is high, and also through the end face opposite to the flange.

(5) Heat of the winding is emitted in the direction of the flange in such a manner that heat is absorbed through the flange from an opponent machine, the heat capacity of which is generally large, so that the stator can be effectively cooled.

(6) The rotor is effectively cooled by the blades integrated with the rotor.

(7) As described above, the stator and rotor are so effectively cooled that the temperature of inside air is low. Although the temperature of inside air is low, the temperature is designed to be close to the limit of heat resistance of the insulating material, and heat of the stator is transmitted to the bearing through the annular disk and bearing box. In this case, heat transmitted from one annular disk is distributed to two bearings, so that the temperature of each bearing is remarkably lowered while the bearing temperature is affected by the inside air.

According to the second aspect of the invention, the following advantages are provided:

(1) The bearing box and bearing are arranged inside the rotor in the radial direction. Therefore, the configuration of the totally-enclosed type rotary electric machine is compressed.

(2) Instead of two brackets, one annular disk having the bearing box composes a frame of the totally-enclosed type rotary electric machine. Accordingly, the length is short in the axial direction, so that the configuration of the totally-enclosed type rotary electric machine is compressed. Although the rotary disk is arranged in the axial direction of the bearing box, the the axial length of rotary disk is almost absorbed by the length of the end portion of the stator winding in the axial direction. Therefore, the length is not substantially extended in the axial direction.

(3) The winding itself is impregnated by the synthetic resin member, the heat conductivity of which is high. Therefore, it is possible to prevent the generation of blow holes in a bundle of the windings, and the heat transfer coefficient of the winding is enhanced.

(4) Heat of the winding is directly emitted to the outside air through the outer circumference of the synthetic resin member, the heat conductivity of which is high, and also through the end face opposite to the flange.

(5) Heat of the winding is emitted in the direction of the flange in such a manner that heat is absorbed through the flange by an opponent machine, the heat capacity of which is generally large, so that the stator can be effectively cooled.

(6) As described above, the stator and rotor are so effectively cooled that the temperature of inside air is sufficiently low. Although the temperature of inside air is low, the temperature is designed to be close to the limit of heat resistance of the insulating material, and heat of the stator is transmitted to the bearing through the annular disk and bearing box. In this case, heat transmitted from one annular disk is distributed to two bearings, so that the temperature of each bearing is remarkably lowered while the bearing temperature is affected by the inside air of low temperature.

According to the third aspect of the invention, the following advantages are provided:

(1) The bearing box and bearing are arranged inside the rotor in the radial direction. Therefore, the configuration of the open type rotary electric machine is compressed.

(2) Instead of two brackets, one annular disk having the bearing box composes a frame of the open type rotary electric machine. Accordingly, the length is short in the axial direction, so that the configuration of the open type rotary electric machine is compressed. Although the rotary disk is arranged in the axial direction of the bearing box, the the axial length of rotary disk is almost absorbed by the length of the end portion of the stator winding in the axial direction. Therefore, the length is not substantially extended in the axial direction.

(3) The winding itself is impregnated with the synthetic resin member, the heat conductivity of which is high. Therefore, it is possible to prevent the generation of blow holes in a bundle of the windings, and the heat transfer coefficient of the winding is enhanced.

(4) Heat of the winding is directly emitted to the outside air through the outer circumference of the synthetic resin member, the heat conductivity of which is high, and also through the end face opposite to the flange.

(5) Heat of the winding is emitted in the direction of the flange in such a manner that heat is absorbed through the flange from an opponent machine, the heat capacity of which is generally large, so that the stator can be effectively cooled.

(6) The temperature of the stator is designed to be close to the limit of heat resistance of the insulating material, and heat of the stator is transmitted to the bearing through the annular disk and bearing box. In this case, heat transmitted from one annular disk is distributed to two bearings, so that the temperature of each bearing is remarkably lowered.

(7) A ventilating hole is formed on the cover so that the rotor can be effectively cooled through the rotary disk.

According to the fourth aspect of the invention, the following advantages are provided:

(1) The bearing box and bearing are arranged inside the rotor in the radial direction. Therefore, the configuration of the open type rotary electric machine is compressed.

(2) Instead of two brackets, the annular disk and the cover integrated by molding compose a frame of the open type rotary electric machine. Accordingly, the length is short in the axial direction, so that the configuration of the open type rotary electric machine is compressed. Although the rotary disk is arranged in the axial direction of the bearing box, the the axial length of rotary disk is almost absorbed by the length of the end portion of the stator winding in the axial direction. Therefore, the length is not substantially extended in the axial direction.

(3) The winding itself is impregnated by the synthetic resin member, the heat conductivity of which is high. Therefore, it is possible to prevent the generation of blow holes in a bundle of the windings, and the heat transfer coefficient of the winding is enhanced.

(4) Heat of the winding is directly emitted to the outside air through the outer circumference of the synthetic resin member, the heat conductivity of which is high, and also through the end face opposite to the flange, so that the stator can be effectively cooled.

(5) Heat of the winding is emitted in the direction of the flange in such a manner that heat is absorbed through the flange from an opponent machine, the heat capacity of which is generally large, so that the stator can be effectively cooled.

(6) The temperature of the stator is designed to be close to the limit of heat resistance of the insulating material, and heat of the stator is transmitted to the bearing through the cover and bearing box. In this case, heat transmitted from one cover is distributed to two bearings, so that the temperature of each bearing is remarkably lowered.

(7) The rotary disk integrated with the rotor is exposed to the atmosphere on the flange side. Therefore, the rotor is effectively cooled.

According to the fifth aspect of the invention, the annular disk and synthetic resin member are integrally molded, so that the number of parts is reduced and the manufacture and composition can be simplified.

The above and other objects and features of the present invention will be more apparent from the following description taken in conjunction with the accompanying drawings.

BRIEF DESCRIPTION OF THE DRAWINGS

FIG. 3 is a sectional view of the totally-enclosed type fan-cooled rotary electric machine according to the third embodiment, where a half portion of the rotary electric machine is shown;

FIG. 4 is a sectional view of the open type rotary electric machine of the fourth embodiment, where a half portion of the rotary electric machine is shown;

DETAILED DESCRIPTION OF THE PREFERRED EMBODIMENTS

Now, a description will be given of the embodiments of the present invention with reference to the accompanying drawings.

Figure 2:
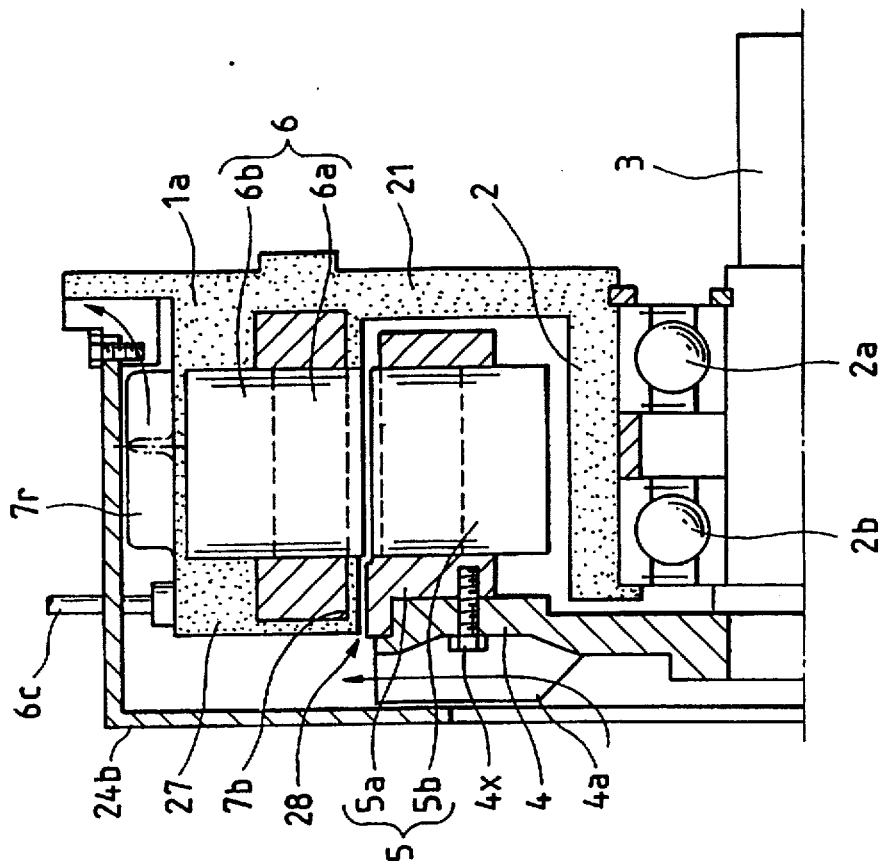
FIG. 2 is a sectional view of the open type rotary electric machine according to the second embodiment, where a half portion of the rotary electric machine is shown.
Figure 1:
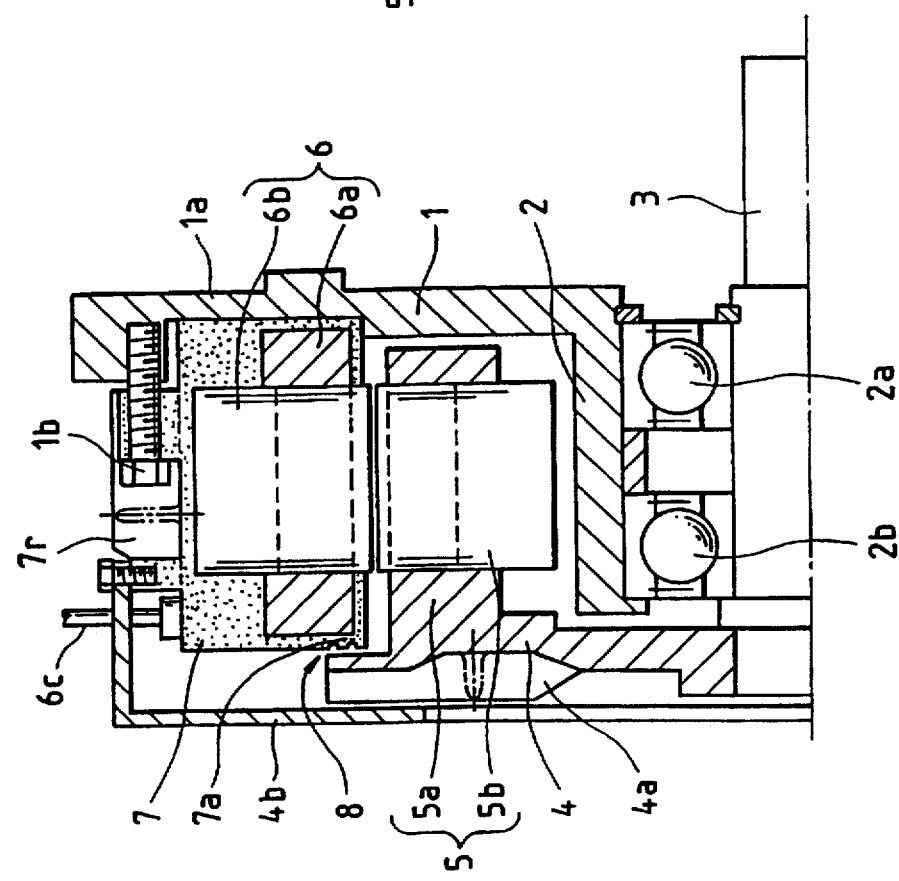
FIG. 1 is a sectional view of the open type rotary electric machine according to a first embodiment of the invention, where a half portion of the rotary electric machine is shown.
Figure 5:
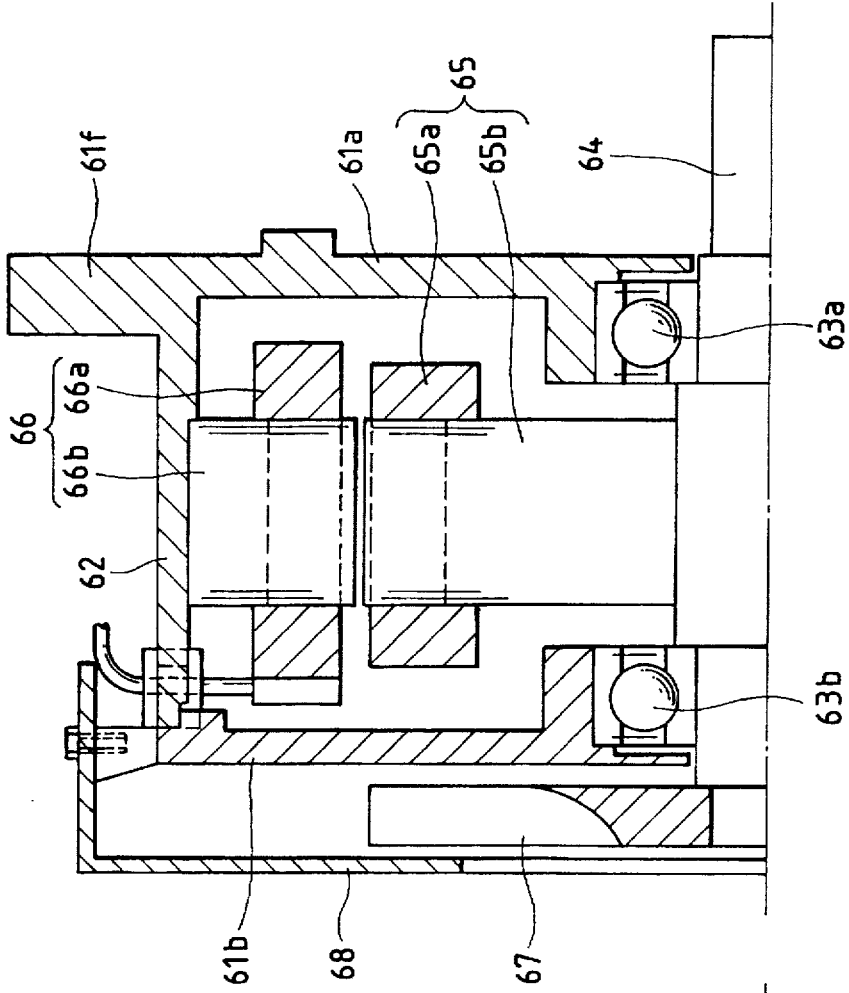
FIG. 5 is a sectional view of the open type rotary electric machine according to the fifth embodiment, where a half portion of the rotary electric machine is shown.
Figure 6:
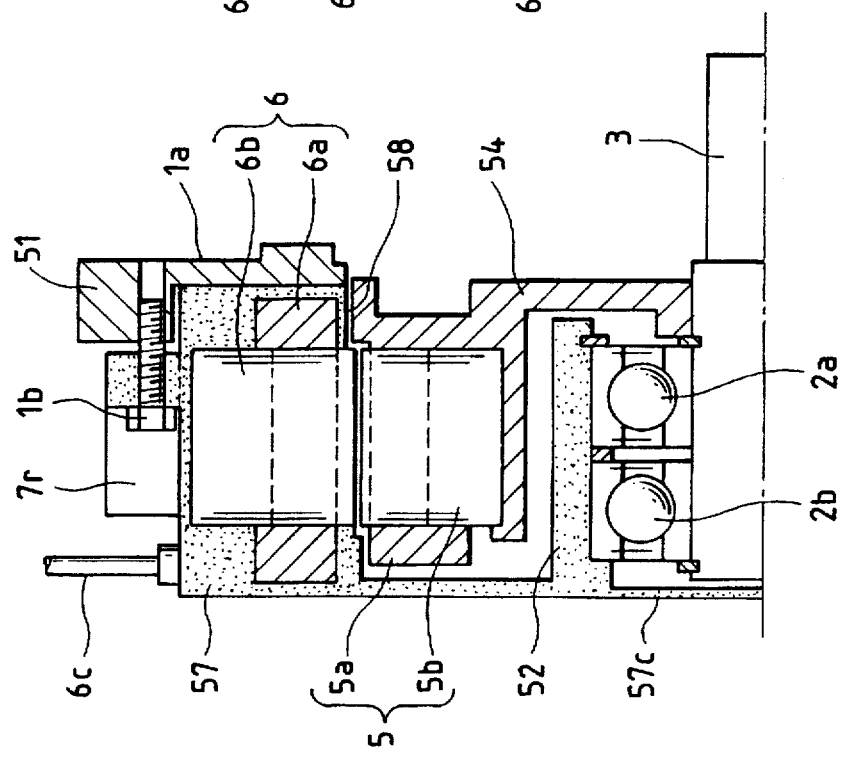
FIG. 6 is a sectional view of the conventional fan-cooled type rotary electric machine, where a half portion of the rotary electric machine is shown.

FIG. 1 is a sectional view of the open type electric machine according to a first embodiment, wherein a half portion of the machine is illustrated. FIG. 2 is a sectional view of the open type electric machine of a second embodiment, wherein a half portion of the machine is illustrated. FIG. 3 is a sectional view of the totally-enclosed type electric machine according to a third embodiment, wherein a half portion of the machine is illustrated. FIG. 4 is a sectional view of the open type electric machine according to a fourth embodiment, wherein a half portion of the machine is illustrated. FIG. 5 is a sectional view of the open type electric machine according to a fifth embodiment, wherein a half portion of the machine is illustrated. Like reference characters are used to indicate like parts in various views, and redundant explanations are omitted here.

In FIG. 1, a flange 1a onto which an opponent machine is attached is formed on an outer end face of an annular disk 1, and a cylindrical bearing box 2 is integrally formed at the shaft center of the annular disk 1. A pair of bearings 2a, 2b are engaged with the bearing box 2, and a shaft 3 is engaged with the bearings 2a, 2b. A rotary disk 4 is attached onto the side opposite to the flange with respect to the shaft 3. The rotary disk 4 is molded integrally with a conductor 5a of a rotor 5 having an iron core 5b, wherein the conductor 5a is arranged outside the bearing box 2 in the radial direction. A stator 6 is arranged outside the rotor 5 through a magnetic clearance air gap. The stator 6 is attached to the stationary side of the electric machine.

In order to enhance the electric insulating property and the heat conductivity, powder of mica is charged into a synthetic resin member 7. The entire periphery of the stator 6 including the winding 6a and iron core 6b is molded by the synthetic resin member 7. An end face of the synthetic resin member 7 on the flange side is closely contacted with the annular disk and fixed by a screw 1b. Blades 4a are provided on an outer end face of the rotary disk 4 and enclosed by a fan cover 4b. A shaft seal device 8 is provided in a gap between an end face small diameter portion 7a of the synthetic resin member 7 on a side opposite to the flange, and the rotary disk 4.

A lead 6c may be molded integrally with the synthetic resin member 7 and pulled out from the synthetic resin member 7. Ribs 7r may be provided on the outer periphery of the synthetic resin member 7, and a labyrinth may be provided in the shaft seal device 8.

Different points between the second embodiment illustrated in FIG. 2 and the first embodiment will be explained as follows. An annular disk 21 is molded integrally with a synthetic resin member 27. The rotary disk 4 is formed differently from the conductor of the rotor 5, and finally they are integrated by a screw 4x. A shaft seal device 28 is provided in a gap between an inner circumference end face portion 7b of the synthetic resin member 27 on the side opposite to the flange, and the conductor 5a of the rotor 5. A fan cover 24b is extended to a position close to the annular disk 21, and ribs 7r are enclosed by the fan cover 24b, so that the cooling effect is enhanced.

According to the first and second embodiments, the following advantages are provided:

(1) Since the bearing box 2, bearings 2a, 2b and shaft 3 are arranged inside the rotor 5 in the radial direction, the configuration of the rotary electric machine is compressed.

(2) Instead of two brackets, one annular disk 1 (or 21) having the bearing box 2 composes a frame of the totally-enclosed type rotary electric machine. Therefore, the length of the rotary electric machine is reduced in the axial direction, and the configuration is compressed. The rotary disk 4 is arranged at the bearing box in the axial direction, however, the length of the rotary disk 4 is substantially absorbed by the length of the end portion of the winding 6a of the stator 6 in the axial direction, so that the length is not substantially extended in the axial direction. Further, the shaft seal device 8 (or 28) provided between the rotary disk 4 or the conductor 5a of the rotor and the synthetic resin member 7 (or 27) also functions as a shaft-sealed structure.

Accordingly, a useless gap is not formed in the axial direction unlike the conventional bracket.

(3) The winding 6a itself is impregnated with the synthetic resin member 7 (or 27), the heat conductivity of which is high. Therefore, it is possible to prevent the generation of blow holes in a bundle of the windings, and the heat transfer coefficient of the winding 6a is enhanced.

(4) Heat of the winding 6a is directly emitted to the outside air through the outer circumference of the synthetic resin member 7 (or 27), the heat conductivity of which is high, and also through the end face opposite to the flange. Therefore, the stator 6 is effectively cooled.

(5) Heat of the winding 6a is emitted in the direction of the flange 1a in such a manner that heat is absorbed through the flange 1a from an opponent machine, the heat capacity of which is generally large, so that the stator 6 can be effectively cooled.

(6) The rotor 5 is effectively cooled by the integrated blades 4a.

(7) As described above, the stator 6 and rotor 5 are so effectively cooled that the temperature of inside air is sufficiently low. Although the temperature of inside air is low, the temperature is designed to be close to the limit of heat resistance of the insulating material, and heat of the stator 6 is transmitted to the bearings 2a, 2b through the annular disk 1 (or 21) and bearing box. 2 In this case, heat transmitted from one annular disk 1 (or 21) is distributed to the two bearings 2a, 2b, so that the temperature of each bearing is remarkably lowered while the bearing temperature is affected by the inside air of low temperature.

In the third embodiment illustrated in FIG. 3 in which a self-cooled type electric rotary machine is shown, a flange 1a onto which an opponent machine is attached is formed on an outer end face of an annular disk 1, and a cylindrical bearing box 2 is integrally formed at the shaft center of the annular disk 1. A pair of bearings 2a, 2b are engaged with the bearing box 2, and a shaft 3 is engaged with the bearings 2a, 2b. A rotary disk 4 is attached onto the side opposite to the flange. The rotary disk 4 is molded integrally with a conductor 5a of a rotor 5, wherein the conductor 5a is arranged outside the bearing box 2 in the radial direction. A stator 6 is arranged outside the rotor 5 through a magnetic clearance. The stator 6 is attached to the stationary side of the electric machine.

In order to enhance the electric insulating property and the heat conductivity, powder of mica is charged into a synthetic resin member 37. The entire periphery of the stator 6 including the winding 6a and iron core 6b is molded by the synthetic resin member 37. An end face of the synthetic resin member 37 on the flange side is closely contacted with the annular disk and fixed by a screw 1b.

The structure described above is similar to the that of the first embodiment. The third embodiment is characterized in that a cover 37c which covers a side end face of the electric machine on the opposite side to the flange is molded integrally with the synthetic resin member 37.

According to the third embodiment, the following advantages are provided:

(1) Since the bearing box 2, bearings 2a, 2b and shaft 3 are arranged inside the rotor 5 in the radial direction, the configuration the totally-enclosed type rotary electric machine is compressed.

(2) Instead of two brackets, one annular disk 1 having the bearing box 2 composes a frame of the totally-enclosed type rotary electric machine. Therefore, the length of the rotary electric machine is reduced in the axial direction, and the configuration is compressed. The rotary disk 4 is arranged at the bearing box in the axial direction, however, the length of the rotary disk 4 is substantially absorbed by the length of the end portion of the winding 6a of the stator 6 in the axial direction, so that the length is not substantially extended in the axial direction.

(3) The winding 6a itself is impregnated by the synthetic resin member 37, the heat conductivity of which is high. Therefore, it is possible to prevent the generation of blow holes in a bundle of the windings, and the heat transfer coefficient of the winding 6a is enhanced.

(4) Heat of the winding 6a is directly emitted to the outside air through the outer circumference of the synthetic resin member 37, the heat conductivity of which is high, and also through the end face opposite to the flange. Therefore, the stator 6 is effectively cooled.

(5) Heat of the winding 6a is emitted in the direction of the flange 1a in such a manner that heat is absorbed through the flange 1a from an opponent machine, the heat capacity of which is generally large, so that the stator 6 can be effectively cooled.

(6) As described above, the stator 6 is so effectively cooled that the temperature of inside air is sufficiently low. Although the temperature of inside air is low, the temperature is designed to be close to the limit of heat resistance of the insulating material, and heat of the stator 6 is transmitted to the bearings 2a, 2b through the annular disk 1 and bearing box. 2 In this case, heat transmitted from one annular disk 1 is distributed to the two bearings 2a, 2b, so that the temperature of each bearing is remarkably lowered while the bearing temperature is affected by the inside air of low temperature.

In the fourth embodiment of the open type rotary machine illustrated in FIG. 4, a portion similar to that of the third embodiment will be explained below. A flange 1a to which an opponent machine is attached is formed on the outer end face of the annular disk 1. A cylindrical bearing box 2 is integrally formed at the axial center of the annular disk 1. A pair of bearings 2a, 2b are fitted in the bearing box 2, and a shaft 3 is engaged with the bearings 2a, 2b. A rotary disk 4 is attached to the shaft 3 on the side opposite to the flange. The rotary disk 4 is molded integrally with a conductor 5a of the rotor 5 arranged outside the bearing box 2 in the radial direction. A stator 6 is arranged outside the rotor 5 through a magnetic clearance. The stator 6 is attached to the stationary side of the rotary electric machine.

In order to enhance the electric insulating property and the heat conductivity, powder of mica is charged into a synthetic resin member 47. The entire periphery of the stator 6 including the winding 6a and iron core 6b is molded by the synthetic resin member 47. An end face of the synthetic resin member 47 on the flange side is closely contacted with the annular disk 1 and fixed by a screw 1b. A cover 47c which covers a side end face on the side opposite to the flange is molded integrally with the synthetic resin member 47.

The fourth embodiment is characterized in that a ventilating hole 47h is open on the cover 47c, so that an open type rotary electric machine is provided. A shaft seal device 48 may be formed between the end portion of the rotor 5 and the synthetic resin member 47 on the cover 47c side.

According to the fourth embodiment, the following advantages are provided:

(1) Since the bearing box 2 and bearings 2a, 2b are arranged inside the rotor 5 in the radial direction, the configuration of the open type rotary electric machine is compressed.

(2) Instead of two brackets, one annular disk 1 having the bearing box 2 composes a frame of the open type rotary electric machine. Therefore, the length of the rotary electric machine is reduced in the axial direction, and the configuration is compressed. The rotary disk 4 is arranged at the bearing box in the axial direction, however, the length of the rotary disk 4 is substantially absorbed by the length of the end portion of the winding 6a of the stator 6 in the axial direction, so that the length is not substantially extended in the axial direction.

(3) The winding 6a itself is impregnated by the synthetic resin member 47, the heat conductivity of which is high. Therefore, it is possible to prevent the generation of blow holes in a bundle of the windings, and the heat transfer coefficient of the winding 6a is enhanced.

(4) Heat of the winding 6a is directly emitted to the outside air through the outer circumference of the synthetic resin member 47, the heat conductivity of which is high, and also through the end face opposite to the flange. Therefore, the stator 6 is effectively cooled.

(5) Heat of the winding 6a is emitted in the direction of the flange 1a in such a manner that heat is absorbed through the flange 1a from an opponent machine, the heat capacity of which is generally large, so that the stator 6 can be effectively cooled.

(6) In this apparatus, the temperature is designed to be close to the limit of heat resistance of the insulating material, and heat of the stator 6 is transmitted to the bearings 2a, 2b through the annular disk 1 and bearing box 2. In this case, heat transmitted from one annular disk 1 is distributed to the two bearings 2a, 2b, so that the temperature of each bearing is remarkably lowered.

(7) The ventilating hole 47h is open on the cover 47c. Therefore, the rotor 5 can be effectively cooled through the rotary disk 4.

In FIG. 5 showing an open type rotary machine of a fifth embodiment, a flange 1a to which an opponent machine is attached is formed on an outer end face of the annular disk 51. A synthetic resin member 57 having a high electric insulating property and heat conductivity molds the overall circumference of the stator 6 including the winding 6a and iron core 6b. The synthetic resin member 57 is closely contacted with the annular disk 51 on the flange side end face. A cover 57c which covers an end face on the flange side, a cylindrical bearing box 52 located at the axial center of the cover 57c in which a pair of bearings 2a, 2b are fitted, and a synthetic resin member 57 are integrally molded. The shaft 3 is engaged with the bearings 2a, 2b, and an end of the shaft 3 is protruded onto the flange side. A rotary disk 54 is attached to the shaft 3 on the flange side. The rotor 5 arranged outside the bearing box 52 in the radial direction is integrated with the rotary disk 54. The stator 6 is arranged outside the rotor 5 through a magnetic clearance. A shaft seal device 58 may be provided between an end of the rotor 5 and the synthetic resin member 57 on the annular disk 51 side.

According to the fifth embodiment, the following advantages are provided:

(1) Since the bearing box 52 and bearings 2a, 2b are arranged inside the rotor 5 in the radial direction, the configuration of the open type rotary electric machine is compressed.

(2) Instead of two brackets, an annular disk 51 and a cover 57c which are integrally molded compose a frame of the open type rotary electric machine. Therefore, the length of the rotary electric machine is reduced in the axial direction, and the configuration is compressed. The rotary disk 54 is arranged at the bearing box 52 in the axial direction, however, the length of the rotary disk 54 is substantially absorbed by the length of the end portion of the winding 6a of the stator 6 in the axial direction, so that the length is not substantially extended in the axial direction.

(3) The winding 6a itself is impregnated by the synthetic resin member 57, the heat conductivity of which is high. Therefore, it is possible to prevent the generation of blow holes in a bundle of the windings, and the heat transfer coefficient of the winding 6a is enhanced.

(4) Heat of the winding 6a is directly emitted to the outside air through the outer circumference of the synthetic resin member 57, the heat conductivity of which is high, and also through the end face opposite to the flange. Therefore, the stator 6 is effectively cooled.

(5) Heat of the winding 6a is emitted in the direction of the flange 1a in such a manner that heat is absorbed through the flange 1a from an opponent machine, the heat capacity of which is generally large, so that the stator 6 can be effectively cooled.

(6) In this apparatus, the temperature is designed to be close to the limit of heat resistance of the insulating material, and heat of the stator 6 is transmitted to the bearings 2a, 2b through the cover 57c and bearing box 52 In this case, heat transmitted from one piece of cover 57c is distributed to the two pieces of bearings 2a, 2b, so that the temperature of each bearing is remarkably lowered.

(7) A rotary disk 54 formed integrally with the rotor 5 is exposed to the atmosphere on the flange side. Therefore, the rotor 5 is effectively cooled.

According to the rotary electric machine of the first aspect of the invention, the bearings and others are arranged inside the rotor in the radial direction, and the frame of the totally-enclosed type rotary electric machine is composed of one annular disk. Therefore, the length in the axial direction can be shortened and the configuration of the rotary electric machine can be compressed. Further, the shaft seal device also functions as a shaft seal with respect to the side opposite to the flange, so that a useless gap in the axial direction can be avoided and the configuration of the totally-enclosed type rotary electric machine can be compressed. In the conventional example, the ratio of compression is limited to 40%, wherein the ratio of compression is defined as a ratio of A to B, and A is a ratio [axial length]/[diameter] of the rotary electric machine and B is a ratio [axial length]/[diameter] of a standard general purpose rotary electric machine. However, according to the present invention, it is possible to accomplish a ratio of compression of 20%. Since the winding is impregnated in the synthetic resin member, the heat conductivity of which is high, the coefficient of heat conductivity of the winding itself is enhanced, and heat is directly emitted to the outside air through the outer periphery of the synthetic resin member and also through the end face on the side opposite to the flange. Further, heat is emitted in the direction of the flange, and the emitted heat is absorbed by an opponent machine, the heat capacity of which is generally large, so that the stator can be effectively cooled. The rotor is effectively cooled by the blades integrally provided. Since both the stator and the rotor are effectively cooled, the temperature of inside air is low, and the heat sent from one piece of annular disk is distributed to two pieces of bearings. Therefore, the bearing temperature is remarkably lowered being affected by the inside air of low temperature.

According to the rotary electric machine of the second aspect of the invention, the bearings and others are arranged inside the rotor in the radial direction, and the frame of the totally-enclosed type rotary electric machine is composed of one annular disk. Therefore, the length in the axial direction can be shortened and the configuration of the rotary electric machine can be compressed. Since the winding is impregnated in the synthetic resin member, the heat conductivity of which is high, the coefficient of heat conductivity of the winding itself is enhanced, and heat is directly emitted to the outside air through the outer periphery of the synthetic resin member and also through the end face on the side opposite to the flange. Further, heat is emitted in the direction of the flange, and the emitted heat is absorbed through the flange by an opponent machine, the heat capacity of which is generally large, so that the stator can be effectively cooled. The heat sent from one piece of annular disk is distributed to two pieces of bearings. Therefore, the bearing temperature is remarkably lowered being affected by the inside air of low temperature.

According to the rotary electric machine of the third aspect of the invention, the bearings and others are arranged inside the rotor in the radial direction, and the frame of the open type rotary electric machine is composed of one annular disk. Therefore, the length in the axial direction can be shortened and the configuration of the open type rotary electric machine can be compressed. Since the winding is impregnated in the synthetic resin member, the heat conductivity of which is high, the coefficient of heat conductivity of the winding itself is enhanced, and heat is directly emitted to the outside air through the outer periphery of the synthetic resin member and also through the end face on the side opposite to the flange. Further, heat is emitted in the direction of the flange, and the emitted heat is absorbed through the flange from an opponent machine, the heat capacity of which is generally large, so that the stator can be effectively cooled. The heat sent from one piece of annular disk is distributed to two pieces of bearings. Therefore, the bearing temperature is remarkably lowered being affected by the inside air of low temperature. Further, since the ventilating hole is open, the rotor is effectively cooled through the rotary disk, and further the rotor is effectively cooled.

According to the rotary electric machine of the fourth aspect of the invention, the bearings and others are arranged inside the rotor in the radial direction, and the frame of the open type rotary electric machine is composed of the annular disk and the cover integrated by molding. Therefore, the length in the axial direction can be shortened and the configuration of the open type rotary electric machine can be compressed. Since the winding is impregnated in the synthetic resin member, the heat conductivity of which is high, the coefficient of heat conductivity of the winding itself is enhanced, and heat is directly emitted to the outside air through the outer periphery of the synthetic resin member and also through the end face on the side opposite to the flange. Further, heat is emitted in the direction of the flange, and the emitted heat is absorbed through the flange from an opponent machine, the heat capacity of which is generally large, so that the stator can be effectively cooled. The heat sent from one piece of annular disk is distributed to two bearings. Therefore, the bearing temperature is remarkably lowered. Since the rotary disk is exposed to the atmosphere on the flange side, the rotor can be effectively cooled.

According to the fifth aspect of the invention, the annular disk and the synthetic resin member are integrally molded, so that the number of parts can be reduced. Therefore, manufacture and structure can be simplified.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A rotary electric machine comprising:

an annular disk;

a flange to which an opponent machine is attached, said flange being formed on an outer end surface of said annular disk;

a pair of bearings;

a shaft engaged with said bearing;

a cylindrical bearing box integrally formed at an axis of said annular disk and engaged with said pair of bearings;

a rotary disk attached to said shaft on a side opposite to said flange, an end of said shaft being projected to the flange side;

a rotor integrally formed on said rotary disk, said rotor being arranged on the outside of said bearing box in the radial direction;

a stator having a winding and iron core and attached to a stationary side of the electric machine, said stator being arranged on the outside of said rotor through a magnetic clearance;

a synthetic resin member having an electrical insulating property and heat conductivity molded on an entire circumference of said stator including said winding and iron core so that said synthetic resin member is in close contact with said annular disk on a side surface of said flange, said synthetic resin member being exposed to air throughout its periphery for cooling; and a cover enclosing an end surface of the electric machine on the side opposite to the flange, joined to said synthetic resin member, and having a ventilating hole.

2. A rotary electric machine as claimed in claim 1, further comprising fan blades formed on an outer end surface of said rotary disk, a fan cover for enclosing said fan blades with the ventilating hole near the fan blades, and a shaft seal device formed in a clearance between a portion from an end surface small diameter part of said synthetic resin member on a side opposite to said flange to an inner circumferential end surface part and one of said rotary disk and a conductor of said rotor, so that a shaft-sealed type electric machine is provided.

3. A rotary electric machine comprising:

an annular disk;

a flange to which an opponent machine is attached, said flange being formed on an outer end surface of said annular disk;

a pair of bearings;

a shaft engaged with said bearing;

a cylindrical bearing box integrally formed at an axis of said annular disk and engaged with said pair of bearings;

a rotary disk attached to said shaft on a side opposite to said flange, an end of said shaft being projected to the flange side;

a rotor integrally formed on said rotary disk, said rotor being arranged on the outside of said bearing box in the radial direction;

a stator having a winding and iron core and attached to a stationary side of the electric machine, said stator being arranged on the outside of said rotor through a magnetic clearance; and a synthetic resin member having an electrical insulating property and heat conductivity molded on an entire circumference of said stator including said winding and iron core so that said synthetic resin member is in close contact with said annular disk on a side surface of said flange, said synthetic resin member being exposed to air throughout its periphery for cooling; and further comprising a cover enclosing an end surface of the electric machine on the side opposite to the flange and molded integrally with said synthetic resin member, so that a ventilating hole is formed on said cover to provide an open type electric machine.

4. A rotary electric machine comprising:

an annular disk;

a flange to which an opponent machine is attached;

a stator having a winding and iron core;

a synthetic resin member having an electrical insulating property and heat conductivity, molded on an entire circumference of said stator including the winding and iron core, said synthetic resin member being in close contact with said annular disk and on a surface of said flange;

a cover covering an end surface opposite to said flange of the electric machine;

a pair of bearings;

a shaft engaged with said pair of bearings;

a cylindrical bearing box engaging with said pair of bearings, said cylindrical bearing box being arranged at an axis of said cover, said cover and said cylindrical bearing box being molded integrally with said synthetic resin member, said synthetic resin member being exposed to air throughout its periphery for cooling;

a rotary disk attached to said shaft, an end of said shaft projecting from the flange side away from said cover, said rotary disk being arranged at an axial position of said flange with respect to said shaft;

a rotor arranged outside of said bearing box in the radial direction, said rotor being integrated with said rotary disk; and said stator arranged outside of said rotor through a magnetic clearance, so that an open type electric machine is provided in that said rotary disk is exposed to the atmosphere.

5. A rotary electric machine as claimed in claim 1, wherein said annular disk and said synthetic resin member are integrally molded.

6. A rotary electric machine as claimed in claim 5, wherein said cover and said synthetic resin member are integrally molded.

* * * * *